US012774405B2

(12) United States Patent
Rotto et al.

(10) Patent No.: US 12,774,405 B2
(45) Date of Patent: *Oct. 27, 2026

(54) COMPOSITION INCLUDING MONOMER WITH A CARBOXYLIC ACID GROUP, MONOMER WITH A HYDROXYL GROUP, A CYCLOALKYL MONOMER, AND CROSSLINKER AND RELATED ARTICLES AND METHODS

(71) Applicant: 3M INNOVATIVE PROPERTIES COMPANY, St. Paul, MN (US)

(72) Inventors: Nelson T. Rotto, Woodbury, MN (US); Wayne S. Mahoney, St. Paul, MN (US); Michael A. Kropp, Cottage Grove, MN (US); Anthony J. Ostlund, Forest Lake, MN (US); Kristine Klimovica, St. Paul, MN (US); Carol-Lynn Spawn, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 481 days.

This patent is subject to a terminal disclaimer.

(21) Appl. No.: 18/268,042

(22) PCT Filed: Dec. 17, 2021

(86) PCT No.: PCT/IB2021/061970

§ 371 (c)(1),
(2) Date: Jun. 16, 2023

(87) PCT Pub. No.: WO2022/130340

PCT Pub. Date: Jun. 23, 2022

(65) Prior Publication Data

US 2024/0059940 A1 Feb. 22, 2024

Related U.S. Application Data

(60) Provisional application No. 63/127,035, filed on Dec. 17, 2020.

(51) Int. Cl.

| | |
|---|---|
| ***C09J 133/02*** | (2006.01) |
| ***B32B 37/12*** | (2006.01) |
| ***C09J 5/00*** | (2006.01) |
| ***C09J 133/14*** | (2006.01) |

(52) U.S. Cl.

CPC ......... *C09J 133/02* (2013.01); *B32B 37/1284* (2013.01); *C09J 5/00* (2013.01); *C09J 133/14* (2013.01); *C09J 2433/00* (2013.01)

(58) Field of Classification Search

None

See application file for complete search history.

(56) References Cited

U.S. PATENT DOCUMENTS

| | | | |
|---|---|---|---|
| 3,347,954 | A | 10/1967 | Bredereck et al. |
| 3,436,359 | A | 4/1969 | Hubin et al. |
| 4,018,851 | A | 4/1977 | Baccei |
| 4,443,587 | A | 4/1984 | Schmitt et al. |
| 4,447,493 | A | 5/1984 | Driscoll et al. |
| 4,605,712 | A | 8/1986 | Mueller et al. |
| 4,833,213 | A | 5/1989 | Leir et al. |
| 5,252,629 | A | 10/1993 | Imai et al. |
| 5,334,681 | A | 8/1994 | Mueller et al. |
| 5,705,561 | A | 1/1998 | Kozakiewicz et al. |
| 6,284,360 | B1 | 9/2001 | Johnson et al. |
| 7,718,730 | B2 | 5/2010 | Roesler et al. |
| 8,313,604 | B2 | 11/2012 | Oshima et al. |
| 8,404,787 | B2 | 3/2013 | Lutz et al. |
| 8,415,425 | B2 | 4/2013 | Kanai et al. |
| 8,545,225 | B2 | 10/2013 | Takei et al. |

(Continued)

FOREIGN PATENT DOCUMENTS

| | | |
|---|---|---|
| CN | 103342966 B | 3/2015 |
| CN | 104449418 B | 1/2017 |

(Continued)

OTHER PUBLICATIONS

"Fundamentals of Coatings", Zhu Wanqiang, Chengdu: Southwest Jiaotong University Press, Jun. 2012, p. 17.
"Synthetic Leather Chemicals", Qiang Taotao, China Light Industry Press, Jul. 2016, p. 221.
Bayramoglu, "Preparation of collagen modified photopolymers: a new type of biodegradable gel for cell growth", Journal of Materials Science: Materials in Medicine, Nov. 2010, vol. 21, pp. 761-775.
Inan, "Preparation of Novel UV-Curable Methacrylated Urethane Resins from a Modified Epoxy Resin and Iisocyanatoethylmethacrylate (IEM)", 2002, Polymer Bulletin, vol. 47, pp. 437-444.
International Search Report for PCT International Application No. PCT/IB2021/061969, mailed on Apr. 29, 2022, 5 pages.

(Continued)

*Primary Examiner* — Robert T Butcher
(74) *Attorney, Agent, or Firm* — Kathleen B. Gross

(57) ABSTRACT

The composition includes at least 16 percent by weight of an acrylic monomer comprising a cycloalkyl group having up to 12 carbon atoms, an acrylic monomer having a carboxylic acid group, an acrylic monomer having a hydroxyl group, and a compound composed of divalent segments L and at least two X groups. The divalent segments L are represented by formula L. Each segment L is respectively directly bonded to two secondary N atoms, two tertiary N atoms, or a secondary and a tertiary N atom. Each $R^1$ represents an alkylene group having from 1 to 4 carbon atoms, and at least some of the $R^1$ groups are $—CH_2—CH_2—CH_2—CH_2—$. Each X group is independently represented by the formula $CH_2═C(R)—C(O)—O—V—W—C(O)—$. Articles and methods using the composition are also described.

$$—[(R^1—O)_n R^1]—. \qquad \text{L}$$

20 Claims, No Drawings

(56) References Cited

U.S. PATENT DOCUMENTS

| | | | |
|---|---|---|---|
| 8,859,683 | B2 | 10/2014 | Takahashi et al. |
| 9,416,299 | B2 | 8/2016 | Kropp et al. |
| 9,475,967 | B2 | 10/2016 | Lipscomb et al. |
| 9,890,304 | B2 | 2/2018 | Yurt |
| 9,957,408 | B2 | 5/2018 | Thompson |
| 10,544,272 | B2 | 1/2020 | Hatakeyama |
| 10,950,364 | B2 | 3/2021 | Hatakeyama |
| 11,390,776 | B2 | 7/2022 | Hajji et al. |
| 11,511,522 | B2 | 11/2022 | Liu et al. |
| 11,739,172 | B2 | 8/2023 | Rotto et al. |
| 2006/0264573 | A1 | 11/2006 | Bennett et al. |
| 2007/0088110 | A1 | 4/2007 | Kohl et al. |
| 2010/0160557 | A1 | 6/2010 | Murofushi |
| 2011/0120646 | A1 | 5/2011 | Gorodisher et al. |
| 2012/0139138 | A1 | 6/2012 | Samuel et al. |
| 2012/0142867 | A1 | 6/2012 | Iwasaki et al. |
| 2012/0301729 | A1 | 11/2012 | Schmider et al. |
| 2015/0291862 | A1 | 10/2015 | Krishnan et al. |
| 2016/0137893 | A1 | 5/2016 | Sherman et al. |
| 2017/0135911 | A1 | 5/2017 | Craig et al. |
| 2018/0312613 | A1 | 11/2018 | Townsend et al. |
| 2020/0017623 | A1 | 1/2020 | Ye et al. |
| 2020/0243798 | A1 | 7/2020 | Matsushita et al. |
| 2021/0040240 | A1 | 2/2021 | Moser et al. |
| 2021/0238459 | A1 | 8/2021 | Shi et al. |
| 2022/0259469 | A1 | 8/2022 | Leone et al. |
| 2022/0325022 | A1 | 10/2022 | Mahoney et al. |
| 2023/0303898 | A1 | 9/2023 | Ostlund et al. |
| 2023/0399463 | A1 | 12/2023 | Mahoney et al. |
| 2024/0076523 | A1 | 3/2024 | Mahoney et al. |
| 2024/0084060 | A1 | 3/2024 | Rotto et al. |
| 2024/0343951 | A1 | 10/2024 | Rotto |

FOREIGN PATENT DOCUMENTS

| | | | |
|---|---|---|---|
| CN | 108192508 | A | 6/2018 |
| DE | 4025776 | A1 | 2/1992 |
| EP | 0493320 | A2 | 7/1992 |
| EP | 0670341 | B1 | 9/1999 |
| JP | 2000053906 | A | 2/2000 |
| JP | 3338331 | B2 | 10/2002 |
| JP | 2016155892 | A | 9/2016 |
| JP | 2017179125 | A | 10/2017 |
| JP | 2018168291 | A | 11/2018 |
| WO | 8202048 | A1 | 6/1982 |

OTHER PUBLICATIONS

International Search Report for PCT International Application No. PCT/IB2021/061970, mailed on May 11, 2022, 4 pages.

Sarac, "Redox Polymerization", Progress in Polymer Science, 1999, vol. 24, pp. 1149-1204.

Yilmaz, "Effects of Nonreactive Resins on the Properties of a UV-Curable Methacrylated Urethane Resin", 1998, Journal of Applied Polymer Science, vol. 69, pp. 1837-1845.

3M Dynamar HC-1101 Polyether Diamine Safety Data Sheet, May 8, 2018, 8 pages.

COMPOSITION INCLUDING MONOMER WITH A CARBOXYLIC ACID GROUP, MONOMER WITH A HYDROXYL GROUP, A CYCLOALKYL MONOMER, AND CROSSLINKER AND RELATED ARTICLES AND METHODS

CROSS-REFERENCE TO RELATED APPLICATION

This application is a national stage filing under 35 U.S.C. 371 of PCT/IB2021/061970, filed Dec. 17, 2021, which claims priority to U.S. Provisional Application No. 63/127,035, filed Dec. 17, 2020, the disclosure of which is incorporated by reference in its entirety herein.

BACKGROUND

Adhesives are known to be useful for bonding one substrate to another, e.g., a metal to a metal, a metal to a plastic, a plastic to a plastic, a glass to a glass. Structural adhesives are attractive alternatives to mechanical joining methods, such as riveting or spot welding, because structural adhesives distribute load stresses over larger areas rather than concentrating such stresses at a few points. Structural adhesives may also produce cleaner and quieter products because they can dampen vibration and reduce noise. Additionally, structural adhesives can be used to bond a variety of materials, sometimes without extensive surface preparation.

Crosslinkers useful for certain adhesive compositions are described in U.S. Pat. No. 4,605,712 (Mueller et al.) and U.S. Pat. No. 4,447,493 (Driscoll et al.) and U.S. Pat. Appl. Pub. Nos. 2016/0137893 (Sherman et al.), 2012/0139138 (Samuel et al.), 2017/0135911 (Craig et al.), and 2020/017720 (Liu et al.). Certain acrylic adhesives reported to have high strength or a high glass transition temperature are described in Int. Pat. Appl. Pub. No. WO 2019/012088 (Hajji et al.), Japanese Patent Application JP2016155892, published Sep. 1, 2016, and China Patent Application CN104449418, published Mar. 25, 2015.

SUMMARY

The present disclosure provides a composition useful, for example, as a sealant or adhesive, for example, a structural adhesive. In one aspect the present disclosure provides a composition including an acrylic monomer comprising a cycloalkyl group having up to 12 carbon atoms, an acrylic monomer having a carboxylic acid group, an acrylic monomer having a hydroxyl group, and a compound composed of divalent segments L and at least two X groups. The divalent segments L are represented by the formula $$-\!\!\left[\left(R^1-O\right)_n R^1\right]\!\!-. \qquad L$$

Each divalent segment L is respectively directly bonded to:

i) two secondary N atoms, each directly bonded to a further divalent segment L or an X group, ii) two tertiary N atoms, each directly bonded to p further divalent segments L and (2-p) X groups, wherein p is 0, 1, or 2, or iii) a secondary N atom directly bonded to a further divalent segment L or an X group; and a tertiary N atom directly bonded to p further divalent segments L and (2-p) X groups, wherein p is 0, 1, or 2.

In divalent segment L, each $R^1$ independently represents an alkylene group having from 1 to 4 carbon atoms, with the proviso that at least some of the $R^1$ groups are $-CH_2-CH_2-CH_2-CH_2-$. Each n independently represents a positive integer, and each X group is independently represented by the formula $$CH_2{=}C(R)-C(O)-O-V-W-C(O)-,$$

in which each R is independently hydrogen or methyl, each W is independently O, S, or NR $R^2$, wherein $R^2$ is hydrogen or alkyl having up to 4 carbon atoms, and each V is independently alkylene that is optionally interrupted by at least one ether linkage or amine linkage and optionally substituted by hydroxyl. The acrylic monomer comprising a cycloalkyl group having up to 12 carbon atoms is present in an amount of at least 16 percent by weight, based on the total weight of acrylic-functional compounds in the composition.

In another aspect, the present disclosure provides an adhesive including the composition disclosed herein at least partially cured with a free-radical initiator.

In another aspect, the present disclosure provides an article bonded with the composition disclosed herein at least partially cured with a free-radical initiator.

In another aspect, the present disclosure provides a method of making a bonded article. The method includes combining the composition disclosed herein with a free-radical initiator to provide an adhesive composition, applying the adhesive composition on at least one of the first substrate or the second substrate, adhering the first substrate and the second substrate using the adhesive composition, allowing the adhesive composition to at least partially cure to make the bonded article.

As used herein:

"alkyl group" and the prefix "alk-" have only C—C bonds and C—H bonds and are inclusive of both straight chain and branched chain groups and of cyclic groups. In some embodiments, alkyl groups have up to 30 carbons (in some embodiments, up to 20, 15, 12, 10, 8, 7, 6, or 5 carbons) unless otherwise specified. Cycloalkyl groups can be monocyclic or polycyclic and, in some embodiments, have from 3 to 10 ring carbon atoms and other alkyl substituents;

the term "acrylic" refers to both acrylic and methacrylic polymers, oligomers, and monomers;

the term "directly bonded to" means bonded to through a single covalent bond;

the term "free-radically polymerizable" means free-radically homopolymerizable and/or free-radically copolymerizable (i.e., with a different monomer/oligomer);

the term "(meth)acryl" refers to acryl (also referred to in the art as acryloyl and acrylyl) and/or methacryl (also referred to in the art as methacryloyl and methacrylyl);

the term "secondary nitrogen" refers to a neutral N atom covalently bonded to H and two carbon atoms; and the term "tertiary nitrogen" refers to a neutral N atom covalently bonded to three carbon atoms.

Terms such as "a", "an" and "the" are not intended to refer to only a singular entity but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility but may be swellable in the presence of an appropriate solvent.

All numerical ranges are inclusive of their endpoints and non-integral values between the endpoints unless otherwise stated (e.g., 1 to 5 includes 1, 1.5, 2, 2.75, 3, 3.80, 4, 5, etc.).

Features and advantages of the present disclosure will be further understood upon consideration of the detailed description as well as the appended claims.

DETAILED DESCRIPTION

High glass transition temperatures may be desirable in adhesives, for example, to allow the adhesive to maintain consistent performance at high temperature. A common strategy for increasing the final glass transition temperature (Tg) of a cured epoxy or polyurethane structural adhesive is to apply external heat during the curing process. For example, when 3M's DP420 (2-part epoxy adhesive) is cured at room temperature for several days, the Tg of the cured adhesive only reaches about 44° C. as measured by Dynamic Mechanical Analysis using the method described in the Examples, below. If this adhesive is heat cured at approximately 138° C. for a few hours, the Tg is increased to 80° C. However, low-temperature curing has become more and more desirable, particularly in the field of electronics assembly and plastic bonding applications, where bonding of thermally sensitive substrates occurs. Low-temperature curing can also reduce thermal stresses due to CTE (coefficient of thermal expansion) mismatch.

Though known structural adhesives may have good high-temperature performance and durability, the rigid bond these structural adhesives create after curing can lead to poor impact resistance of the bonded parts and subsequent bond failure. Additionally, adhesives having rigid bonds have high and uneven stresses distributed throughout the bond, with the stress at the edges of the bond typically higher than the stress in the middle of the bond. The high stress of rigid structural adhesives can lead to the undesirable distortion of bonded materials (i.e., bond-line read through), which can be visually observed particularly when bonding larger parts, such as, for example, automotive panels.

The present disclosure provides compositions that can provide adhesives with glass transition temperatures in a range from 120° C. to 180° C. when cured at room temperature and bonded constructions displaying good adhesion to a wide variety of substrates, even, in some embodiments, when the substrates receive no surface treatment (e.g., corona, flame, abrasion) before bonding. In some embodiments, the compositions provide adhesives with useful elongations, which may improve impact resistance and reduce stress in a bond line. In some embodiments, the compositions of the present disclosure provide adhesives with excellent resistance to water and humidity.

The composition of the present disclosure includes a compound useful, for example, as a crosslinker. The compound includes at least two X groups and includes divalent segments L represented by formula:

$$-\left[\left(R^1-O\right)_n R^1\right]- . \quad L$$

Each divalent segment L is respectively directly bonded, through the single covalent bonds illustrated on each end of the divalent segments, to:

i) two secondary N atoms, each directly bonded to a further divalent segment L or an X group, ii) two tertiary N atoms, each directly bonded to p further divalent segments L and (2-p) X groups, wherein p is 0, 1, or 2, or iii) a secondary N atom directly bonded to a further divalent segment L or an X group; and a tertiary N atom directly bonded to p further divalent segments L and (2-p) X groups, wherein p is 0, 1, or 2.

Each $R^1$ in divalent segments L independently represents an alkylene group having from 1 to 4 carbon atoms, with the proviso that at least some of the $R^1$ groups are $—CH_2—CH_2—CH_2—CH_2—$. In some embodiments, at least 50, 60, 70, 80, 90, or 95 percent of the $R^1$ groups are $—CH_2—CH_2—CH_2—CH_2—$. Other useful $R^1$ groups include $—CH_2—$, $—CH_2—CH_2—$, $—CH_2—CH_2—CH_2—$, $—CH(CH_3)CH_2—$, $—CH_2CH(CH_3)—$, $—CH(CH_2CH_3)CH_2—$, $—CH_2(CH_2CH_3)CH—$, and $—CH_2(CH_3)_2C—$. In some embodiments, the $R^1$ groups comprise $—CH_2—CH_2—CH_2—CH_2—$ and at least one of $—CH_2—CH_2—$, $—CH_2—CH_2—CH_2—$, $—CH(CH_3)CH_2—$, or $—CH_2CH(CH_3)—$. In some embodiments, all of the $R^1$ groups are $—CH_2—CH_2—CH_2—CH_2—$. When all of the $R^1$ groups are $—CH_2—CH_2—CH_2—CH_2—$, the L divalent segments can be written as

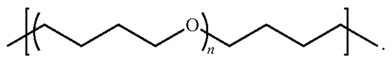

L

In divalent segments L, including any of the embodiments described above for L, each n independently represents a positive integer; for example, 1, 2, 3, 4, 5, 6, 7, 8, 9, 10, 20, 30, 50, 100, or more. In some embodiments, n can be up to 500 or more.

The compound useful, for example, as a crosslinker, includes at least two X groups. Each X group is independently represented by the formula $$CH_2═C(R)—C(O)—O—V—W—C(O)—,$$

in which each R is independently hydrogen or methyl. In some embodiments, each R is hydrogen. In some embodiments, each R is methyl.

In formula $CH_2═C(R)—C(O)—O—V—W—C(O)—$, each V is independently alkylene that is optionally interrupted by at least one ether linkage or amine linkage and optionally substituted by hydroxyl. In some embodiments, each V is independently alkylene that is optionally interrupted by at least one ether linkage. In some embodiments, each V is independently alkylene having 2 to 10, 2 to 8, 2 to 6, 2 to 4, 3 to 6, 3 to 8, or 3 to 10 carbon atoms.

In formula $CH_2═C(R)—C(O)—O—V—W—C(O)—$, each W is independently O, S, or $NR^2$, wherein $R^2$ is hydrogen or alkyl having up to 4 carbon atoms. In some embodiments, each W is independently O or NH. In some embodiments, each W is NH.

In some embodiments, the compound having at least two X groups and divalent segments L has a number average molecular weight of at least 1000, 2000, 3000, 3500, or 4000 grams per mole and up to 54000, 40,000, 30,000, or 20,000 grams per mole as measured by gel permeation chromatography at 40° C. versus polystyrene standards in accordance with ASTM test method D3016-97 (2018). In particular, polymers can be analyzed by gel permeation chromatography (GPC) using Reliant GPC (Waters e2695 pump/autosampler) with Waters 2424 evaporative light scattering detector and PL-Gel-2 Columns; 300×7.5 mm each; one 3-micron Mixed-E (nominal MW range up to 30,000 Daltons) and one 5-micron Mixed-D (nominal MW range 200-400,000 Daltons).

Compounds having at least two X groups and divalent units L can be made by nucleophilic addition of primary amine groups on a polyamine precursor compound with a reactant compound having carbonate, thiocarbonate, carbamate, or isocyanate group and also an acrylate or methacrylate group. An example of a useful compound of this type is 2-isocyanatoethyl methacrylate ("IEM"). Suitable polyamine precursors have divalent segments L represented by formula:

$$-\!\!\left[(R^1-O)_n-R^1\right]\!\!- \qquad L$$

as described above in any of its embodiments. Each divalent segment L is respectively directly bonded to two N atoms, each independently directly bonded to p further divalent segments L and (2-p) H atoms, wherein p is 0, 1, or 2. In some embodiments, the polyamine precursor comprises less than 7 weight percent (wt. %), less than 6 wt. %, less than 5 wt. %, less than 4 wt. %, less than 3 wt. %, less than 2 wt. %, less than 1 wt. %, or less than 0.5 wt. % of secondary or tertiary amine groups. Suitable polyamine precursors can be obtained from 3M Company, St. Paul, Minnesota, under the trade designation "DYNAMAR HC-1101" or prepared, for example, as described in U.S. Pat. No. 3,436,359 (Hubin et al.).

Compositions of the present disclosure can include 2 to 60 percent by weight, or 5 to 50 percent by weight, of the compound having at least two X groups and divalent segments L, but this is not a requirement. In some embodiments, the crosslinker is present in an amount in a range from 20 percent by weight to 40 percent by weight, or from 20 percent by weight to 35 percent by weight, based on the total weight of acrylic-functional compounds in the composition.

The composition of the present disclosure includes an acrylic monomer comprising a cycloalkyl group. The cycloalkyl can have up to 14, 12, or 10 carbon atoms. Such monomers can be useful, for example, for increasing the Tg of an adhesive or sealant made from the composition. Examples of suitable acrylic monomers comprising the cycloalkyl group having up to 14 or 12 carbon atoms include at least one of isobornyl acrylate, isobornyl methacrylate, cyclohexyl acrylate, cyclohexyl methacrylate, t-butylcyclohexyl acrylate, or t-butylcyclohexyl methacrylate. In some embodiments, the acrylic monomer comprising the cycloalkyl group having up to 14 or 12 carbon atoms comprises at least one of isobornyl acrylate or isobornyl methacrylate. Such monomers are available from a variety of commercial sources, for example, isobornyl acrylate available from Sartomer as SR506, or from Evonik Performance Materials GmbH as VISIOMER IBOA, isobornyl methacrylate available from Sartomer as SR423A or from Evonik Performance Materials GmbH under the trade name VISIOMER IBOMA, cyclohexyl methacrylate (available from Evonik Performance Materials GmbH as VISIOMER c-HMA), dicyclopentanyl methacrylate (available from Hitachi Chemical as FANCRYL FA-513M), isobornyl cyclohexyl methacrylate (available from Designer Molecules, Inc., San Diego, California, as product MM-304), and 4-t-butylcyclohexyl methacrylate (available from Miwon North America, Exton, Pennsylvania, as Miramer M1151).

The acrylic monomer comprising a cycloalkyl group having up to 12 carbon atoms is present in the composition in an amount of at least 15 or 16 percent by weight, based on the total weight of acrylic-functional compounds in the composition. In some embodiments, the acrylic monomer comprising the cycloalkyl group is present in an amount of at least 17, 18, 19, or 20 percent by weight and up to 40, 35, or 30 percent by weight, based on the total weight of the acrylic-functional compounds in the composition. In some embodiments, the acrylic monomer comprising the cycloalkyl group is present in an amount in a range from 15 to 35 percent by weight, 16 to 35 percent by weight, 17 to 30 percent by weight, or 17 to 28 percent by weight, based on the total weight of acrylic-functional compounds in the composition.

The composition of the present disclosure includes an acrylic monomer comprising a carboxylic acid group. In some embodiments, the composition of the present disclosure includes more than 15 or at least 16, 17, 18, 19, or 20 percent by weight, based on the total weight of acrylic-functional compounds in the composition, of an acrylic monomer comprising a carboxylic acid group. In some embodiments, the acrylic monomer comprising a carboxylic acid group is present in an amount of up to 28 percent by weight, 30 percent by weight, or 35 percent by weight, based on the total weight of acrylic-functional compounds in the composition. In some embodiments, the acrylic monomer comprising a carboxylic acid group is present in an amount in a range from 15 to 35 percent by weight, 18 to 35 percent by weight, 20 to 30 percent by weight, or 20 to 28 percent by weight, based on the total weight of acrylic-functional compounds in the composition. Examples of suitable acrylic monomer comprising a carboxylic acid group include methacrylic acid, acrylic acid, methacrylic acid, β-acryloyl oxyethyl hydrogen succinate and β-methacryloyl oxyethyl hydrogen succinate. Many acrylic monomers comprising a carboxylic acid group are available from commercial sources, for example, methacrylic acid available from Evonik Performance Materials GmbH as VISIOMER GMAA and β-methacryloyl oxyethyl hydrogen succinate available from Shin-Nakamura Co. Ltd., Arimoto, Japan, as NK ESTER SA. In some embodiments, the acrylic monomer comprising a carboxylic acid group is methacrylic acid.

The composition of the present disclosure includes an acrylic monomer comprising a hydroxyl group. The acrylic monomer comprising the hydroxyl group can be useful, for example, for providing the composition with improved adhesion to a variety of plastics, in some embodiments, polyamides. In some embodiments, the acrylic monomer comprising the hydroxyl group is present in an amount of at least 5 or 10 percent by weight and up to 25, 24, 23, 22, 21, or 20 percent by weight, based on the total weight of the acrylic-functional compounds in the composition. In some embodiments, the acrylic monomer comprising the hydroxyl group is present in an amount of at least 5 percent by weight and up to 25 percent by weight, at least 10 percent by weight up to 24 percent by weight, or at least 10 percent by weight up to 22 percent by weight, based on the total weight of the acrylic-functional compounds in the composition. Selecting a level of the acrylic monomer comprising the hydroxyl group in a range from 5 percent by weight and up to 25 percent by weight can be useful, for example, for providing the composition with improved adhesion to a variety of plastics while maintaining relatively high water and humidity resistance.

Examples of suitable acrylic monomers comprising a hydroxyl group include 2-hydroxyethyl acrylate, 2-hydroxyethyl methacrylate, 2- and 3-hydroxypropyl acrylate, 2- and 3-hydroxypropyl methacrylate, hydroxybutyl acrylate, hydroxybutyl methacrylate, caprolactone mono(meth)acrylate, available under the trade designation "SR-495B" from Sartomer and other poly(e-caprolactone) mono[2-(meth) acryloxy ethyl] esters, poly(e-caprolactone) mono[2-acryloxy ethyl] esters, 2-hydroxy-3-alkyloxy methacrylate, 2-hydroxy-3-alkyloxy acrylate, and polyethylene glycol mono acrylates and methacrylates. Many acrylic monomers comprising a hydroxyl group are available from commercial sources, for example, 2-hydroxyethyl methacrylate (available from Evonik Performance Materials GmbH as VISIOMER HEMA 97 and HEMA 98), hydroxypropyl methacrylate (available from Evonik Performance Materials GmbH as VISIOMER HPMA 97 and HPMA 98), ultra-high purity 2-hydroxyethyl methacrylate (available from Evonik Performance Materials GmbH as VISIOMER UHP HEMA), polypropylene glycol monomethacrylate (available from Miwon North America, Exton, Pennsylvania, as MIRAMER M1051), and $CH_2{=}CHC(O)O(CH_2CH_2O)_{7\text{-}9}H$ available, for example, from Nippon Oil & Fats Company, Tokyo, Japan under the trade designation "BLEMMER".

In some embodiments, the composition comprises methyl methacrylate. Methyl methacrylate is available from commercial sources, including from Evonik Performance Materials GmbH as VISIOMER MMA. In some embodiments, the methyl methacrylate is present in an amount of at least 1, 2, 3, 4, or 5 percent by weight and up to 15, 14, 13, 12, 11, or 10 percent by weight, based on the total weight of the acrylic-functional compounds in the composition. In some embodiments, the methyl methacrylate is present in an amount of at least 1 percent by weight and up to 10 percent by weight, at least 2 percent by weight up to 10 percent by weight, or at least 4 percent by weight up to 10 percent by weight, based on the total weight of the acrylic-functional compounds in the composition.

Lauryl methacrylate can be useful in some embodiments of the composition of the present disclosure and is available from a variety of commercial sources, for example, lauryl methacrylate available from BASF, Florham Park, New Jersey, as LMA 1214 F. In some embodiments, however, the composition is free of lauryl methacrylate or comprises up to one percent lauryl methacrylate, based on the total weight of the acrylic-functional compounds in the composition.

In some embodiments, the composition of the present disclosure further comprises an acrylic monomer comprising a phosphate or phosphonate group. Such monomers can be useful, for example, for enhancing the adhesion to metal substrates. Useful acrylic monomer comprising a phosphate or phosphonate group include ethylene glycol methacrylate phosphate and phosphonate-functional (meth)acrylate monomers (e.g., the SIPOMER PAM resins from Solvay Specialty Polymers USA, LLC or those from Miwon North America (Exton, Pennsylvania) as MIRAMER SC1400 and MIRAMER SC1400A). Vinyl phosphonic acid may also be useful. In some embodiments, the composition of the present disclosure further comprises an acrylic monomer comprising a phosphonate group. The phosphonate- or phosphate-functionalized acrylic monomer can be present in the composition, for example, up to 10, 8, 6, 5, or 4 percent by weight, based on the total weight of acrylic-functional compounds in the composition. When present, the phosphonate- or phosphate-functionalized acrylic monomer is present in an amount of at least 0.5, 1, or 2 percent by weight, based on the total weight of acrylic-functional compounds in the composition.

Compositions of the present disclosure can also include other monofunctional free-radically polymerizable monomers. Examples of useful monomers include 2-phenoxyethyl (meth)acrylate, cyclohexyl (meth)acrylate, benzyl (meth)acrylate, alkoxylated lauryl (meth)acrylate, alkoxylated phenol (meth)acrylate, alkoxylated tetrahydrofurfuryl (meth)acrylate, caprolactone (meth)acrylate, cyclic trimethylolpropane formal (meth)acrylate, ethylene glycol methyl ether (meth)acrylate, ethoxylated nonyl phenol (meth)acrylate, isodecyl (meth)acrylate, isooctyl (meth)acrylate, octadecyl (meth)acrylate (stearyl (meth)acrylate), tetrahydrofurfuryl (meth)acrylate, tridecyl (meth)acrylate, tetrahydrofurfuryl (meth)acrylate, allyl (meth)acrylate, ethyl (meth)acrylate, n-propyl (meth)acrylate, n-butyl (meth) acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-methoxyethyl (meth)acrylate, 2-ethoxyethyl (meth)acrylate, 2- or 3-ethoxypropyl (meth)acrylate, 2-(2-ethoxyethoxy)ethyl acrylate, glycidyl (meth)acrylate, N-(2-(2-oxo-1-imidazolidinyl)ethyl)methacrylamide, and methacrylamidoethyl ethylene urea ("MAEEU") available from Solvay Specialty Polymers USA, LLC as SIPOMER WAM II), and combinations thereof.

Specific examples of other mono(meth)acrylate monomers useful in some embodiments of the composition of the present disclosure include 2-phenoxyethyl methacrylate (available from SARTOMER as SR340), benzyl methacrylate (available from Miwon North America, Exton, Pennsylvania, as MIRAMER M1183), phenyl methacrylate (available from Miwon North America as MIRAMER M1041), allyl methacrylate (available from Evonik Performance Materials GmbH as VISIOMER AMA), n-butyl methacrylate (available from Evonik Performance Materials GmbH as VISIOMER n-BMA), isobutyl methacrylate (available from Evonik Performance Materials GmbH as VISIOMER i-BMA), glycerol formal methacrylate (available from Evonik Performance Materials GmbH as VISIOMER GLYFOMA), 2-(2-butoxyethoxy)ethyl methacrylate (available from Evonik Performance Materials GmbH as VISIOMER BDGMA), 2-isocyanatoethyl methacrylate (available from Showa Denko K. K. (Tokyo, Japan) as KarenzMOI), 2-(methacryloyloxy)ethyl phthalate mono ((HEMA phthalate) available as product number X-821-2000 from ES STECH, Inc., Essington, Pennsylvania), 2-(methacroyloxy)ethyl maleate (HEMA maleate available as product number X-846-0000 from ESSTECH, Inc.), methoxy diethylene glycol methacrylate (available from Shin-Nakamura Co. Ltd. as M-20G, methoxy triethylene glycol methacrylate (available from Shin-Nakamura Co. Ltd. as M-30G, methoxy tetraethylene glycol methacrylate (available from Shin-Nakamura Co. Ltd. as M-40G, methoxy tripropylene glycol methacrylate (available from Shin-Nakamura Co. Ltd. as M-30PG, butoxy diethylene glycol methacrylate (available from Shin-Nakamura Co. Ltd. as B-20G), phenoxy ethylene glycol methacrylate (available from Shin-Nakamura Co. Ltd. as PHE-1G), phenoxy diethylene glycol methacrylate (available from Shin-Nakamura Co. Ltd. as PHE-2G), dicyclopentenyloxyethyl methacrylate (available from Hitachi Chemical, Tokyo, Japan, as FANCRYL FA-512M), 4-methacryloxyethyl trimellitic anhydride (available from Designer Molecules, Inc. as product A-304), 2-methacryloxyethyl phenyl urethane (available from Polysciences, Inc., Warrington, Pennsylvania), trifluoroethyl methacrylate (available from Hampford Research Inc., Stratford, Connecticut), methacrylamide (available from Evonik Performance Materials GmbH as VISIOMER MAAmide), 2-dimethylaminoethyl methacrylate (available from Evonik Performance Materials GmbH as VISIOMER MADAME), 3-dimethylaminopropyl methacrylamide (available from Evonik Performance Materials GmbH as VISIOMER DMAPMA), and combinations thereof.

Compositions of the present disclosure can also include at least one free-radical initiator (i.e., an initiator of free-radical polymerization). The free-radical initiator can be a single compound or a combination of compounds, which is referred to as a free-radical initiator system.

In some embodiments, the free-radical initiator is a redox initiator system, as one-electron transfer redox reactions may be an effective method of generating free radicals under mild conditions. Redox initiator systems have been described, for example, in *Progress in Polymer Science* (1999), 24, pp. 1149-1204.

In some embodiments, the redox initiator system is a blend of a peroxide with an amine, where the polymerization is initiated by the decomposition of the organic peroxide activated by the redox reaction with amine reducing agent. Typically, the peroxide is benzoyl peroxide, and the amine is a tertiary amine. Aromatic tertiary amines, for example, are suitable for generating the primary radicals, with N,N-dimethyl-4-toluidine ("DMT") being the most common amine reducing agent.

In some embodiments, the redox cure initiator system comprises a barbituric acid derivative and a metal salt. In some embodiments, the barbituric acid/metal salt cure initiator system may further comprise an organic peroxide, an ammonium chloride salt (e.g., benzyltributylammonium chloride), or a mixture thereof.

Examples of free-radical initiators based on barbituric acid include redox initiator systems having (i) a barbituric acid derivative and/or a malonyl sulfamide, and (ii) an organic peroxide, selected from the group consisting of the mono- or multifunctional carboxylic acid peroxide esters. Examples of useful barbituric acid derivatives include 1,3,5-trimethylbarbituric acid, 1,3,5-triethylbarbituric acid, 1,3-dimethyl-5-ethylbarbituric acid, 1,5-dimethylbarbituric acid, 1-methyl-5-ethylbarbituric acid, 1-methyl-5-propylbarbituric acid, 5-ethylbarbituric acid, 5-propylbarbituric acid, 5-butylbarbituric acid, 1-benzyl-5-phenylbarbituric acid, 1-cyclohexyl-5-ethylbarbituric acid, and the thiobarbituric acids mentioned in published German patent application DE 42 19 700 A1 (Imai et al.).

The barbituric acids and barbituric acid derivatives described in U.S. Pat. No. 3,347,954 (Bredereck et al.) and U.S. Pat. No. 9,957,408 (Thompson), as well as the malonyl sulfamides disclosed in the European Pat. No. EP 0 059 451 B1 (Schmitt et al.), may also be useful in embodiments of the present disclosure. Examples of malonyl sulfamides include 2,6-dimethyl-4-isobutylmalonyl sulfamide, 2,6-diisobutyl-4-propylmalonyl sulfamide, 2,6-dibutyl-4-propylmalonyl sulfamide, 2,6-dimethyl-4-ethylmalonyl sulfamide or 2,6-dioctyl-4-isobutylmalonyl sulfamide.

Barbituric acid-based free-radical initiators typically contain mono- or multifunctional carboxylic acid peroxyesters as organic peroxides. Carbonic peroxyesters are also included among the multifunctional carboxylic acid peroxyesters within the meaning of the present disclosure. Suitable examples include carbonic-diisopropyl-peroxydiester, neodecanoic acid-tertiary-butyl-peroxyester, neodecanoic acid-tertiary-amyl-peroxyester, maleic acid-tertiary-butyl-monoperoxyester, benzoic acid-tertiary-butyl-peroxyester, 2-ethylhexanoic acid-tertiary-butyl-peroxyester, 2-ethylhexanoic acid-tertiary-amyl-peroxyester, carbonic-monoisopropylester-monotertiary-butyl-peroxyester, carbonic-dicyclohexyl-peroxyester, carbonic dimyristyl-peroxyester, carbonic dicetyl peroxyester, carbonic-di(2-ethylhexyl)-peroxyester, carbonic-tertiary-butyl-peroxy-(2-ethylhexyl)ester or 3,5,5-trimethylhexanoic acid-tertiary-butyl-peroxyester, benzoic acid-tertiary-amyl-peroxyester, acetic acid-tertiary-butyl-peroxyester, carbonic-di(4-tertiary-butyl-cyclohexyl)-peroxyester, neodecanoic acid-cumene-peroxyester, pivalic acid-tertiary-amyl-peroxyester and pivalic acid tertiary-butyl-peroxyester.

In particular, carbonic-tertiary-butyl-peroxy-(2-ethylhexyl)ester (commercially available from Arkema, Inc. (King of Prussia, Pennsylvania) as LUPEROX TBEC) or 3,5,5-trimethyl-hexanoic acid-tertiary-butyl-peroxyester (commercially available from Arkema, Inc. as LUPEROX 270) can be used as organic peroxides in some embodiments of the present disclosure.

Metal salts that may be used with the barbituric acid derivative can include transition metal complexes, especially salts of cobalt, manganese, copper, and iron. When the metal salt is a copper compound, the salt may possess the general formula CuXn, where X is an organic and/or inorganic anion and n=1 or 2. Examples of suitable copper salts include copper chloride, copper acetate, copper acetylacetonate, copper naphthenate, copper salicylate or complexes of copper with thiourea or ethylenediaminetetraacetic acid, and mixtures thereof. In some embodiments, the copper salt is copper naphthenate.

Another redox initiator system suitable for use in embodiments of the present disclosure comprises an inorganic peroxide, an amine-based reducing agent, and an accelerator, where the amine may be an aromatic and/or aliphatic amine, and the polymerization accelerator is at least one selected from the group consisting of sodium benzenesulfinate, sodium p-toluenesulfinate, sodium 2,4,6-trisopropyl benzenesulfinate, sodium sulfite, potassium sulfite, calcium sulfite, ammonium sulfite, sodium bisulfate, and potassium bisulfate. An example of an inorganic peroxide useful in this system is peroxodisulfate as described in U.S. Pat. No. 8,545,225 (Takei, et al.).

In some embodiments, the composition of the present disclosure includes a free-radical initiator comprising a metal salt (e.g., copper naphthenate) and an ammonium salt (e.g., benzyltributylammonium chloride). In some embodiments, composition includes a cure initiator system comprising a barbituric acid derivative and a metal salt and optionally comprising at least one of an organic peroxide and an ammonium chloride salt.

The composition may include, alone or in combination with other free-radical initiator(s), at least one photoinitiator that is activated by light, generally using a ultraviolet (UV) lamp, although other light sources such as LED lamps, Xe flashlamps, and lasers can also be used with the appropriate choice of photoinitiator.

Useful photoinitiators include those known as useful for photocuring free-radically polyfunctional (meth)acrylates. Examples of suitable photoinitiators include benzoin and its derivatives such as alpha-methylbenzoin; alpha-phenylbenzoin; alpha-allylbenzoin; alpha benzylbenzoin; benzoin ethers such as benzil dimethyl ketal (e.g., available as OMNIRAD BDK from IGM Resins USA Inc., St. Charles, Illinois), benzoin methyl ether, benzoin ethyl ether, benzoin n-butyl ether; acetophenone and its derivatives such as 2-hydroxy-2-methyl-1-phenyl-1-propanone (e.g., available as OMNIRAD 1173 from IGM Resins USA Inc. and 1-hydroxycyclohexyl phenyl ketone (e.g., available as OMNIRAD 184 from IGM Resins USA Inc.); 2-methyl-1-[4-(methylthio)phenyl]-2-(4-morpholinyl)-1-propanone (e.g., available as OMNIRAD 907 from IGM Resins USA Inc.); 2-benzyl-2-(dimethylamino)-1-[4-(4-morpholinyl)phenyl]-1-butanone (e.g., available as OMNIRAD 369 from IGM Resins USA Inc.), and triaryl phosphines and phosphine oxide derivatives such as ethyl-2,4,6-trimethylbenzoylphenyl phosphinate (e.g., available as TPO-L from IGM Resins USA Inc.), and bis-(2,4,6-trimethylbenzoyl)phenylphosphine oxide (e.g., available under the trade designation OMNIRAD 819 from IGM Resins USA Inc.).

Other examples of useful photoinitiators include pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, or benzanthraquinone), halomethyltriazines, benzophenone and its derivatives, iodonium salts and sulfonium salts, titanium complexes such as bis(eta5-2,4-cyclopentadien-1-yl)-bis[2,6-difluoro-3-(1H-pyrrol-1-yl)phenyl]titanium (e.g., available under the trade designation CGI 784DC from BASF, Florham Park, New Jersey); halomethylnitrobenzenes (e.g., 4-bromomethylnitrobenzene), and combinations of photoinitiators where one component is a mono- or bis-acylphosphine oxide (e.g., available under the trade designations IRGACURE 1700, IRGACURE 1800, and IRGACURE 1850 from BASF, Florham Park, New Jersey, and as OMNIRAD 4265 from IGM Resins USA Inc.).

The free-radical initiator can also be a thermally activated free-radical initiator such as an azo initiator (e.g., azobisisobutyronitrile) or a peroxide (e.g., benzoyl peroxide).

The free-radical initiator can be used in the composition in an amount sufficient to permit an adequate free-radical reaction rate of curing of the curable composition upon initiation of polymerization, amounts which may be readily determined by one of ordinary skill in the relevant arts. In some embodiments of the present disclosure, the free-radical initiator is present in the curable composition at a level of 0.1 to 10 percent by weight, or 0.5 to 5 percent by weight of the free-radically polymerizable components in the composition; however, this is not a requirement.

In some embodiments, the composition of the present disclosure comprises 20 to 30 percent by weight of the acrylic monomer comprising a carboxylic acid group, 10 to 20 percent by weight of the acrylic monomer comprising a hydroxyl group, 16 to 30 percent by weight of the acrylic monomer comprising the cycloalkyl group, 0.5 to 10 percent by weight of an acrylic monomer comprising a phosphonate group, 4 to 10 percent by weight methyl methacrylate, and 15 to 30 percent by weight of the compound comprising divalent segments L and at least two X groups, based on the total weight of acrylic-functional compounds in the composition and 0.1 to 10 percent by weight of at least one free-radical initiator, based on the weight of the curable composition. In some embodiments, the composition of the present disclosure comprises 15 to 25 percent by weight of the acrylic monomer comprising a carboxylic acid group, 15 to 25 percent by weight of the acrylic monomer comprising a hydroxyl group, 15 to 25 percent by weight of the acrylic monomer comprising the cycloalkyl group, 4 to 10 percent by weight percent of methyl methacrylate, 0.5 to 10 percent by weight of an acrylic monomer comprising a phosphonate group, and 20 to 35 percent by weight of the compound comprising divalent segments L and at least two X groups, based on the total weight of the acrylic-functional compounds in the composition. In some of these embodiments, the composition includes 0.1 to 10 percent by weight of at least one free-radical initiator based on the total weight of the curable composition.

The composition of the present disclosure may include other components useful, for example, in sealant and adhesive compositions. For example, the composition can include at least one of toughening agents (e.g., acrylic core/shell polymers; styrene-butadiene/methacrylate core/shell polymers; acrylonitrile-butadiene rubber), plasticizers (e.g., aliphatic and aromatic hydrocarbons, alkyl esters, alkyl ethers, aryl esters, and aryl ethers), tackifiers, corrosion inhibitors, UV stabilizers, antioxidants, free-radical inhibitors, flame retardants, thixotropic agents such as fumed silica, dyes, pigments (e.g., ferric oxide, brick dust, carbon black, and titanium oxide), reinforcing agents (e.g., silica, magnesium sulfate, calcium sulfate, and beryllium aluminum silicate), clays such as bentonite, other suitable filler (e.g., glass beads, talc, and calcium metasilicate), dispersing agents, wetting agents, adhesion promoters (e.g., silane coupling agents), antistatic agents, thermally and/or electrically conductive particles, foaming agents, and hollow polymeric or ceramic microspheres (e.g., glass bubbles). In some embodiments, the composition of the present disclosure includes a filler. Further examples of fillers useful for some embodiments of the composition of the present disclosure include at least one of a micro-fibrillated polyethylene, a fumed silica, a talc, a wollastonite, an aluminosilicate clay (e.g., halloysite), phlogopite mica, calcium carbonate, kaolin clay, metal oxides (e.g., barium oxide, calcium oxide, magnesium oxide, zirconium oxide, titanium oxide, zinc oxide), nanoparticle fillers (e.g., nanosilica, nanozirconia).

The composition of the present disclosure may be provided as a one-part or two-part composition; for example, depending on the free-radical initiator chosen. When a free-radical initiator system including a combination of components is used, some of the components can be included in a first part and some components can be included in the second part of a two-part composition. In some embodiments, if the composition of the present disclosure is the first part of a two-part composition, the first part may include at least one of a metal salt or an ammonium chloride salt as described above in any of their embodiments, and the second part may include at least one of a barbituric acid derivative and an organic peroxide. The second part may be in the form of a paste, for example, that includes a plasticizer or other diluent and optionally at least one of tougheners, dyes, pigments, tackifiers, or fillers as described above. Some peroxide pastes, for example, are commercially available. An example of a useful second part is an acrylic adhesive accelerator obtained under the trade designation "3M SCOTCH-WELD DP8410NS", from 3M Company, St. Paul, Minn.

In some embodiments, if the composition of the present disclosure is the first part of a two-part composition, the first part and the second part can be combined at any suitable volume ratio. For example, the first part and the second part can be combined at a volume ratio in a range of from about 5:100 to about 100:1, about 10:100 to about 50:1, or about 1:1 to 20:1.

The first part and the second part can be located in any suitable system or kit for containing, mixing, and dispensing the first part and the second part. The system can be suited for large-scale industrial applications or small-scale applications. Either system can include first and second chambers for holding the respective first part and second part. The chambers can be sized for any application and formed from plastic, metal, or any other suitable material. A dispenser can be adapted to receive the first part and the second part and dispense a mixture of the first part and the second part on a substrate. The dispenser can function to facilitate mixing of the first part and the second part, or a mixing chamber can be disposed upstream of the dispenser and in fluid communication with the first chamber and the second chamber. The mixing chamber can be adapted to rotate in order to facilitate mixing, or the mixing chamber can include a number of baffles to induce rotation of the first part and the second part.

To facilitate movement of the first part and the second part, the system can include elements such as one or more plunger or one or more pumps. The one or more plungers can be useful for systems that are handheld. In these embodiments, a user can push one or two plungers, between at least a first and a second position, to force the first part and the second part through the system. If there is one plunger, then the first part and the second part can be dispensed at equal volumes or at a predetermined volume ratio.

Pumps can be useful in industrial applications where large volumes or a continuous supply of the first part and the second part are dispensed. These systems can include one or more pumps that are in fluid communication with the first and second chambers. The one or more pumps can be located downstream of the first and second chambers but upstream of the mixing chamber. In embodiments of the system in which there are two pumps in fluid communication with respective first and second chambers, the pumps can be adapted or controlled to pump an equal volume of the first part and the second part or to pump different quantities of each part according to a predetermined volume ratio.

The composition of the present disclosure may be at least partially cured by exposure to actinic electromagnetic radiation (e.g., ultraviolet and/or visible light), thermal energy (e.g., in an oven, infrared radiation, or thermal conduction), by exposure to oxygen, by combining two-parts of a two part composition, or any combination of the foregoing.

After at least partial curing, a crosslinked composition is generally obtained, and if sufficiently cured it may be suitable for use as a structural adhesive to bond two adherends. In such use, the composition is typically sandwiched between the adherends and at least partially cured; for example, sufficient to achieve at least a desired level of bond strength.

Compositions of the present disclosure may be used, for example, to bond a first substrate to a second substrate to provide a bonded article. Many types of substrates may be bonded with compositions of the present disclosure such as metal (e.g., stainless steel or aluminum), glass (e.g., which may be coated with indium tin oxide), a polymer (e.g., a plastic, rubber, thermoplastic elastomer, or thermoset), or a composite. A composite material may be made from any two or more constituent materials with different physical or chemical properties. When the constituents are combined to make a composite, a material having characteristics different from the individual components is typically achieved. Some examples of useful composites include fiber-reinforced polymers (e.g., carbon fiber reinforced epoxies and glass-reinforced plastic); metal matrix compositions, and ceramic matrix composites. Useful polymeric substrates that can be bonded include polymers such as polyolefins (polypropylene, polyethylene, high density polyethylene, blends of polypropylene), polyamide 6 (PA6), polyamide 6,6, acrylonitrile butadiene styrene (ABS), polycarbonate (PC), PC/ABS blends, polyvinyl chloride (PVC), polyamide (PA), polyurethane (PUR), thermoplastic elastomers (TPE), polyoxymethylene (POM), polystyrene, poly(methyl) methacrylate (PMMA), polyvinyl chloride (PVC), polyetheretherketone (PEEK), and combinations thereof. The substrate may also include a metal coating on such polymers. The composition of the present disclosure can be useful, for example, for bonding electronic articles and automotive and aerospace components.

In some embodiments, a first substrate may be bonded to a second substrate by combining the composition with an accelerator to provide an adhesive composition, applying the composition of the present disclosure to at least a portion of one surface of the first substrate, adhering the first substrate and the second substrate using the adhesive composition, and allowing the adhesive composition to cure to make the bonded article. While it is not practical to enumerate a particular curing temperature suitable for all situations, generally suitable temperatures are in a range from about 23° C. to about 200° C. In some embodiments, advantageously, the composition can be cured at room temperature (e.g., 23° C. to 30° C.), for at least 60 minutes, 90 minutes, 120 minutes, 6 hours, 12 hours, 24 hours, 48 hours, or 72 hours for example, to cure the composition.

As shown in the Examples, below, the composition of the present disclosure can be cured at room temperature to provide an adhesive having a glass transition temperature of 138° C. to 158° C. In some embodiments, the adhesive has an elongation of 51%, which can make it useful for bonding substrates at low temperatures. The adhesive can bond a wide variety of materials, including polyamide, for which it provides an overlap shear strength of 1000 psi at room temperature. In another embodiment, the adhesive bonds to aluminum and provides a remarkable overlap shear strength of at least 1000 psi at 120° C. The adhesive bonds can withstand water or high humidity as shown in Tables 10 and 11.

Some Embodiments of the Disclosure

In a first embodiment, the present disclosure provides a composition comprising:

at least 16 percent by weight, based on the total weight of acrylic-functional compounds in the composition, of an acrylic monomer comprising a cycloalkyl group having up to 12 carbon atoms;

an acrylic monomer comprising a carboxylic acid group;

an acrylic monomer comprising a hydroxyl group; and a compound comprising divalent segments L and at least two X groups, wherein the divalent segments L are represented by the formula:

$$-\left[\left(R^1-O\right)_n R^1\right]- . \qquad L$$

wherein each divalent segment L is respectively directly bonded to:

i) two secondary N atoms, each directly bonded to a further divalent segment L or an X group, ii) two tertiary N atoms, each directly bonded to p further divalent segments L and (2-p) X groups, wherein p is 0, 1, or 2, or iii) a secondary N atom directly bonded to a further divalent segment L or an X group; and a tertiary N atom directly bonded to p further divalent segments L and (2-p) X groups, wherein p is 0, 1, or 2, wherein each $R^1$ independently represents an alkylene group having from 1 to 4 carbon atoms, with the proviso that at least some of the $R^1$ groups are $—CH_2—CH_2—CH_2—CH_2—$, wherein each n independently represents a positive integer, and wherein each X group is independently represented by the formula $$CH_2{=}C(R)—C(O)—O—V—W—C(O)—$$

wherein each W is independently O, S, or $NR^2$, wherein $R^2$ is hydrogen or alkyl having up to 4 carbon atoms, and wherein each V is independently alkylene that is optionally interrupted by at least one ether linkage or amine linkage and optionally substituted by hydroxyl.

In a second embodiment, the present disclosure provides the composition of the first embodiment, wherein at least fifty percent of the $R^1$ groups are $—CH_2—CH_2—CH_2—CH_2—$.

In a third embodiment, the present disclosure provides the composition of the first or second embodiment, wherein the divalent L segments are represented by formula

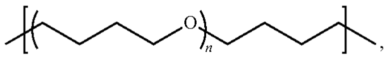

wherein each n represents a positive integer.

In a fourth embodiment, the present disclosure provides the composition of any one of the first to third embodiments, wherein the acrylic monomer comprising the hydroxyl group is present in an amount of at least 5 or 10 percent by weight and up to 25, 24, 23, 22, 21, or 20 percent by weight, based on the total weight of the acrylic-functional compounds in the composition.

In a fifth embodiment, the present disclosure provides the composition of any one of the first to fourth embodiments, further comprising methyl methacrylate.

In a sixth embodiment, the present disclosure provides the composition of any one of the first to fifth embodiments, further comprising methyl methacrylate in an amount of at least 4 percent by weight and up to 10 percent by weight, based on the total weight of the acrylic-functional compounds in the composition.

In a seventh embodiment, the present disclosure provides the composition of any one of the first to sixth embodiments, wherein the acrylic monomer comprising the carboxylic acid group is present in an amount of at least 15 or 20 percent by weight and up to 35 or 30 percent by weight, based on the total weight of the acrylic-functional compounds in the composition.

In an eighth embodiment, the present disclosure provides the composition of any one of the first to seventh embodiments, wherein the composition is free of lauryl methacrylate or comprises up to one percent lauryl methacrylate, based on the total weight of the acrylic-functional compounds in the composition.

In a ninth embodiment, the present disclosure provides the composition of any one of the first to eighth embodiments, wherein the acrylic monomer comprising the cycloalkyl group having up to 12 carbon atoms comprises at least one of isobornyl acrylate, isobornyl methacrylate, cyclohexyl acrylate, cyclohexyl methacrylate, t-butylcyclohexyl acrylate, or t-butylcyclohexyl methacrylate.

In a tenth embodiment, the present disclosure provides the composition of any one of the first to ninth embodiments, wherein the acrylic monomer comprising the cycloalkyl group having up to 12 carbon atoms comprises at least one of isobornyl acrylate or isobornyl methacrylate.

In an eleventh embodiment, the present disclosure provides the composition of any one of the first to tenth embodiments, wherein the acrylic monomer comprising the cycloalkyl group is present in an amount of at least 17, 18, 19, or 20 percent by weight and up to 40, 35, or 30 percent by weight, based on the total weight of the acrylic-functional compounds in the composition.

In a twelfth embodiment, the present disclosure provides the composition of any one of the first to eleventh embodiments, wherein the compound comprising divalent segments L and at least two X groups is present in an amount in a range from 20 percent by weight to 40 or 35 percent by weight, based on the total weight of acrylic-functional compounds in the composition.

In a thirteenth embodiment, the present disclosure provides the composition of any one of the first to twelfth embodiments, further comprising a toughening agent.

In a fourteenth embodiment, the present disclosure provides the composition of any one of the first to thirteenth embodiments, further comprising filler.

In a fifteenth embodiment, the present disclosure provides the composition of any one of the first to fourteenth embodiments, further comprising a free-radical initiator.

In a sixteenth embodiment, the present disclosure provides the composition of any one of the first to fifteenth embodiments, further comprising a free-radical inhibitor.

In a seventeenth embodiment, the present disclosure provides the composition of any one of the first to sixteenth embodiments, packaged as a first part of a two-part adhesive composition, wherein the second part comprises a free-radical initiator.

In an eighteenth embodiment, the present disclosure provides an adhesive comprising the composition of any one of the first to fifteenth embodiments at least partially cured with a free-radical initiator, wherein the adhesive composition has a glass transition temperature in a range from 120° C. to 180° C.

In a nineteenth embodiment, the present disclosure provides an adhesive comprising the composition of any one of the first to fifteenth embodiments at least partially cured with a free-radical initiator, wherein the adhesive bonds to polyamide and provides an overlap shear strength of at least 1000 psi at room temperature.

In a twentieth embodiment, the present disclosure provides an adhesive comprising the composition of any one of the first to fifteenth embodiments at least partially cured with a free-radical initiator, wherein the adhesive bonds to aluminum and provides an overlap shear strength of at least 1000 psi at 120° C.

In a twenty-first embodiment, the present disclosure provides an article bonded with the composition of any one of the first to fifteenth embodiments at least partially cured with a free-radical initiator, wherein the article comprises at least one of polyamide, metal, or an epoxy composite.

In a twenty-second embodiment, the present disclosure provides a method of making a bonded article comprising a first substrate and a second substrate, the method comprising:

combining the composition of any one of the first to fourteenth embodiments with a free-radical initiator to provide an adhesive composition;

applying the adhesive composition on at least one of the first substrate or the second substrate;

adhering the first substrate and the second substrate using the adhesive composition; and allowing the adhesive composition to at least partially cure to make the bonded article.

In a twenty-third embodiment, the present disclosure provides the method of the twenty-second embodiment, wherein at least one of the first substrate or the second substrate comprises at least one of nylon, acrylonitrile butadiene styrene (poly(methyl) methacrylate, or polyvinyl chloride.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight, and all reagents used in the examples were obtained, or are available, from general chemical suppliers such as, for example, Sigma-Aldrich, St. Louis, MO, or may be synthesized by conventional methods. The following abbreviations are used in this section: in=inches, g=grams, min=minutes, ° C.=degrees Celsius, ° F.=degrees Fahrenheit, RH=relative humidity, Hz=hertz, J=Joules, °=degree angle, um=micrometers, and rpm=revolutions per minute.

TABLE 1

Materials Used in the Examples

| Name | Description |
|---|---|
| IEM | 2-isocyanatoethyl methacrylate, obtained under the trade designation “KARENZ MOI”, from Showa Denko K. K., Tokyo, Japan |
| HEMA | 2-hydroxyethyl methacrylate (HEMA), obtained under the trade designation “VISIOMER HEMA 97”, from Evonik Performance Materials GmbH, Essen, Germany |
| LMA | Lauryl Methylacrylate; obtained under the trade designation “LMA 1214F”, from BASF, Florham Park, NJ |
| MMA | Methyl methacrylate, obtained under the trade designation “VISIOMER MMA”, from Evonik Performance Materials GmbH, Essen, Germany |
| IBOMA | Isobornyl Methylacrylate, obtained under the trade designation “VISIOMER TERRA IBOMA”, from Evonik Performance Materials GmbH, Essen, Germany. |
| Methacrylic acid | Methacrylic acid, obtained from Alfa Aesar, Tewksbury, MA |
| CLEARSTRENGTH XT100 | Methylmethacrylate-butadiene-styrene (MBS) core-shell toughening agent, obtained under the trade designation “CLEARSTRENGTH XT100”, from Arkema Inc., King of Prussia, PA |
| BAYMOD N 34.52 | Acrylonitrile-butadiene rubber (NBR) with calcium stearate as separating agent, obtained under the trade designation “BAYMOD N 34.52”, from ARLANXEO Corporation, Pittsburgh, PA |
| MEHQ | Hydroquinone monomethyl ether (4-Methoxyphenol), obtained from Millipore Sigma, St. Louis, MO |
| N + CL− | Benzyl tributylammonium chloride, obtained from Sachem Americas, Austin, TX |
| HC-1101 | Branched poly(tetrahydrofuran) diamine with primary amine content of 7143 g/eq and total amine content of 5243 g/eq, obtained under the trade designation “DYNAMAR HC-1101”, from 3M Company, St. Paul, MN |
| CuNap | Copper naphthenate 8% in mineral spirits), obtained from Strem Chemicals, Newburyport, MA |
| PAM 200 | Phosphonate-functional methacrylate monomer, obtained under the trade designation “SIPOMER PAM-200”, from Solvay Novecare, Cranbury, NJ |
| ESS50F | Micro fibrillated polyethylene, hydrophilic grade, aspect ratio 20:1 length:diameter, obtained under the trade designation “SHORT STUFF ESS50F”, from MiniFibers, Inc., Johnson City, TN |
| HDK H18 | Hydrophobic amorphous silica, obtained under the trade designation “HDK H18”, from Wacker Silicones, Müchen, Germany |
| PW80 | Filler, obtained under the trade designation “LKAB PW80”, from LKAB Minerals, Inc., Chicago, IL |
| CB | Carbon black, obtained under the trade designation “MONARCH 120”, from Cabot Corp., Billerica, MA |
| SL300 | Hollow ceramic spheres having mean particle size of 100 micrometers, obtained under the trade designation “E-SPHERES SL300”, from Envirospheres Pty., Ltd., Linfield NSW, Australia |
| DP8410NS | Accelerator, acrylic adhesive, obtained under the trade designation “3M SCOTCH-WELD DP8410NS”, from 3M Company, St. Paul, MN |
| DP8407 | 10:1 acrylic adhesive, obtained under the trade designation “3M SCOTCH-WELD DP8407”, from 3M Company |

Test Methods

Tensile Testing of Cured Films

Films of cured compositions were prepared by extruding Example 1 or 2 or Illustrative Examples A or B as two-part compositions through a static mixer onto a silicone polyester liner. Using a second silicone polyester liner, a film of the adhesive was prepared between both liners at approximately 1 mm (0.04 in) thickness using a simple knife coater. The adhesive film was allowed to cure at room temperature a minimum of 24 hours before testing. Tensile elongation measurements were performed according to ASTM Standard D638-14 "Standard Test Method for Tensile Properties of Plastics", 2015, using a TYPE-V die for specimen cutting, and a 50.8 mm (2 in)/minute crosshead test speed.

Dynamic Mechanical Analysis ("DMA")

Film samples were prepared using the films prepared for the Tensile Testing as described above. Film samples were cut to approximately 5-6 mm width×1 mm thick×57 mm length (0.20-0.24 in×0.04 in×2.25 in) and tested on a DMAQ800 (TA Instruments Inc., New Castle, DE) using a dual cantilever fixture with the following settings: frequency=1 Hz, oscillation amplitude=15 um, and minimum oscillation force=0.02 N. The film samples were equilibrated to −50° C. (122° F.) and held at that temperature for five minutes, followed by a temperature ramp of 3.0° C. (37.4° F.)/minute to 200° C. (392° F.).

Overlap Shear Test

The resulting mixed adhesives were used to prepare overlap shear test samples on Nylon 6,6, and aluminum substrates. Nylon 6,6 coupon samples, obtained from Plastics International, Eden Prairie, MN were 6.35×25.4×101.6 mm (¼×1×4 in) were only wiped with isopropanol alcohol prior to bonding. Blasted Green FR4 Glass Epoxy coupons (obtained from Plastics International measuring 2.54×10.16×0.318 cm (1 in×4 in×0.125 in) were only wiped with isopropanol alcohol prior to bonding. Aluminum coupon samples obtained from Joseph t. Ryerson and Son, Inc., Coon Rapids, MN were 2.54×10.16×0.16 cm (1 in×4 in×1/16 in) and were wiped with isopropanol alcohol prior to bonding A 1.27-cm (½ in) overlap was used when preparing the overlap shear samples. The bond line was clamped with binder clips during cure and the clips were removed after 24 hours at 25° C. Testing for overlap shear was run on a 5,620 lb (25 kN) load cell for aluminum samples and a 2250 lb (10 kN) load cell for Nylon 6,6 samples. Nylon 6,6 overlap shear samples were run at 50.8 mm (2 in)/min and aluminum overlap shear samples were run at 2.54 mm (0.1 in)/min. The peak stress values (psi) were reported, and each value an average of three specimens.

Water Soak Overlap Shear Test

Nine overlap shear samples were prepared using grit blasted FR4 Glass Epoxy coupons (obtained from Plastics International measuring 2.54×10.16×0.318 cm (1 in×4 in×0.125 in). The OLS samples were bonded with a 1.27-cm (0.5 in) overlap and adhesives were let to cure for at least 24 hours. Three of the nine samples were used as controls and were stored in the laboratory under ambient conditions. The remaining six OLS samples were placed in a 1 gallon glass jar, and the jar was filled with water to completely submerge the samples. The jar was placed in an oven set at 60° C. (140° F.). After one week, three samples were removed from the jar and let equilibrate to room temperature over about 1 hour. The three exposed samples and the three control samples were then tested for OLS (peak stress), and the % strength retention was reported. After, two weeks, the remaining three exposed samples were tested for OLS (peak stress) and compared to the controls. The % strength retention was reported. Note that in some instances, only six OLS samples were tested (three controls and three two week exposure samples). Results of this testing are reported in Table 10.

Cataplasm Test

Ten overlap shear samples were prepared using abraded aluminum coupons, with aluminum obtained from Joseph t. Ryerson and Son, Inc., Coon Rapids, MN, measuring 2.54×10.16×0.16 cm (1 in×4 in×1/16 in). The coupons were abraded with a pad with the trade designation "SCOTCH BRITE" (3M Company, St. Paul, MN) and mounted on an electric palm sander followed by wiping with MEK solvent prior to bonding. The OLS samples were bonded with a 1.27-cm (0.5 in) overlap and adhesives were let to cure for at least 24 hours. Five of the ten samples were used as controls and were stored in the laboratory under ambient conditions. The remaining five OLS samples were carefully wrapped in 100% cotton batting. The wrapped samples were placed in a bag, with trade designation "ZIPLOC" (S.C. Johnson and Son, Inc., Racine, WI), and distilled water was added with the amount of water added being ten times the total weight of the cotton batting used. The bag was sealed and placed in a second identical bag which was also sealed. The double bagged sample was then placed on an aluminum tray and placed in an oven set at 71° C. (160° F.) for two weeks. After 2 weeks in the 71° C. (160° F.) oven, the samples were immediately placed in a freezer at −17.8° C. (0° F.) for two hours. And then after 2 hours in the freezer, the samples were let to thaw over two hours, and then immediately the standard overlap shear test was administered at 2.54 mm (0.1 in)/min. Both the cataplasm samples and the control samples were tested for OLS at the same time, and again, the % strength retention was reported based on the average of all the controls. Results for this testing are reported in Table 11.

Bell Peel Strength Test

The procedures outlined in ASTM D3167 were followed. Adhesive was applied to the etched aluminum substrate (1.0" wide×0.063" thick×8.0" long) and 17 mil spacer beads were added to the applied adhesive prior to bonding. A second aluminum substrate (1.0" wide×0.020" thick×10" long) was then applied to the adhesive, and an approximately 10-lb metal plate was used to compress the bonded aluminum test samples. The adhesive was let cure for at least three days. After curing, the peel test was done using a 200 lb load cell and a Floating Roller apparatus. The sample was pulled at 6'/min.

Preparation of Methacryloxyurea-Terminated Branched Diamine Poly(tetrahydrofuran) (EPX-IEM)

DYNAMAR HC-1101 ("HC-1101") was heated at 65° C. to melt the solid material and reduce its viscosity. Melted HC-1101 (245.0 g) was charged in a 3-necked, round bottom flask equipped with distillation head, thermocouple, and overhead stirrer. The flask was sparged with nitrogen and heated to 70° C. To the highly viscous, heated "HC-1101", methyl ethyl ketone (60 mL) was added with stirring. Afterwards, the same amount of methyl ethyl ketone was distilled off under vacuum to provide dried "HC-1101". To the dried "HC-1101", 5.32 g of IEM was added dropwise under nitrogen, and stirring was continued at 70° C. for 16 hours. Isocyanate consumption was monitored by transmission-FTIR spectroscopy. The resulting material was drained at 70° C. to afford 196.2 g (78% yield) of a viscous, light-yellow oil that solidified upon cooling to ambient temperature.

Example 1

The NTR03-42-580 adhesive resin mixture was prepared by combining components in the amounts indicated in Table 3 in a polypropylene MAX 600 DAC cup (FlackTek, Inc., Landrum, SC). Each of the sets of material ingredients was speed mixed as noted. First, the hydroxyethyl methacrylate (HEMA), methacrylic acid, isobornyl methacrylate (IBOMA), benzyl tributylammonium chloride (N+CL-), and methoxyethylhydroquinone (MEHQ) were combined and speed mixed with a DAC 400.2 VAC (FlackTek, Inc., Landrum, SC 29356) for 4 minutes at 1500 rpm. Then the solid EPX-IEM material was melted in an oven at 71° C. (160° F.) over several hours, and the melted material was added to the speed mixer cup, and the resulting material was speed mixed for 4 minutes at 2250 rpm. The XT100 was then added to the speed mixer cup, and the mixture was speed mixed for 4 minutes at 2250 rpm. Next, the CuNap, PAM 200, HDK H18, and ESS50F were added, and the mixture was speed mixed for 4 minutes at 2250 rpm. The PW80, SB, and SL300 was added next and the mixture was speed mixed for 4 minutes at 2250 rpm. After mixing, the material was cooled in a freezer for about 5 minutes. Methyl methacrylate was then added followed by speed mixing for 1 minute at 2000 rpm. After speed mixing, the final adhesive resin mixture was then degassed by capping the mixing cup with a polypropylene lid that contained a vent hole, and high-shear mixed under reduced pressure 0.68 psi (~35 Torr) for 2 minutes at 1500 rpm. The adhesive resin mixture prepared was separately loaded into the 10-part side of a 10:1 dual syringe cartridge dispenser, using the accelerator with the trade designation "3M SCOTCH-WELD DP8810NS" Acrylic Adhesive (3M Company, St. Paul, MN) in the 1-part side of the dispenser in each case. All bonds for overlap shear testing were prepared by dispensing approximately 0.3 grams of adhesive resin mixture and the accelerator resin through a static mixing tip.

TABLE 3

Components for Example 1

| | Weight % |
|---|---|
| IBOMA | 18.61 |
| HEMA | 13.00 |
| Methacrylic Acid | 19.33 |
| MMA | 6.00 |
| CLEARSTRENGTH XT100 | 5.04 |
| MEHQ | 0.05 |
| N + Cl− | 0.77 |
| EPX-IEM | 18.00 |
| CuNap | 0.11 |
| PAM 200 | 3.32 |
| ESS50F | 0.68 |
| HDK H18 | 2.04 |
| PW80 | 12.51 |
| CB | 0.17 |
| SL300 | 0.37 |
| Total | 100.00 |

Example 2

Example 2 was prepared by combining components in the amounts indicated in Table 4 in a polypropylene MAX 600 DAC cup (FlackTek, Inc., Landrum, SC). Each of the sets of material ingredients was speed mixed as noted. First, the hydroxyethyl methacrylate (HEMA), methacrylic acid, isobornyl methacrylate (IBOMA), benzyl tributylammonium chloride (N+CL-), and methoxyethylhydroquinone (MEHQ) were combined and speed mixed with a DAC 400.2 VAC (FlackTek, Inc., Landrum, SC) for 4 minutes at 1500 rpm. Then the solid EPX-IEM material was melted in an oven at 71° C. (160° F.) over several hours, and the melted material was added to the speed mixer cup, and the resulting material was speed mixed for 4 minutes at 2250 rpm. The XT100 was then added to the speed mixer cup, and the mixture was speed mixed for 4 minutes at 2250 rpm. Next, the CuNap, PAM 200, HDK H18, and ESS50F were added, and the mixture was speed mixed for 4 minutes at 2250 rpm. The PW80, SB, and SL300 was added next and the mixture was speed mixed for 4 minutes at 2250 rpm. After mixing, the material was cooled in a freezer for about 5 minutes. Methyl methacrylate was then added followed by speed mixing for 1 minute at 2250 rpm. After speed mixing the adhesive mixture was let cool. The final adhesive resin mixture was then degassed by capping the mixing cup with a polypropylene lid that contained a vent hole, and high-shear mixed under reduced pressure 0.68 psi (~35 Torr) for 2 minutes at 1500 rpm. The adhesive resin mixture prepared was separately loaded into the 10-part side of a 10:1 dual syringe cartridge dispenser, using the accelerator with the trade designation "3M SCOTCH-WELD DP8810NS" Acrylic Adhesive (3M Company, St. Paul, MN) in the 1-part side of the dispenser in each case. All bonds for overlap shear testing were prepared by dispensing approximately 0.3 grams of adhesive resin mixture and the accelerator resin through a static mixing tip.

TABLE 4

Components for Example 2

| | Weight % |
|---|---|
| IBOMA | 13.95 |
| HEMA | 16.00 |
| Methacrylic Acid | 16.00 |
| MMA | 5.00 |
| CLEARSTRENGTH XT100 | 6.33 |
| MEHQ | 0.05 |
| N + Cl− | 0.57 |
| EPX-IEM | 24.00 |
| CuNap | 0.11 |
| PAM 200 | 3.35 |
| ESS50F | 0.67 |
| HDK H18 | 2.51 |
| PW80 | 8.94 |
| CB | 0.15 |
| SL300 | 0.34 |
| Total | 100.00 |

Illustrative Example A

Illustrative Example A was prepared by combining components in the amounts indicated in Table 5 in a polypropylene MAX 600 DAC cup (FlackTek, Inc.). Each of the sets of material ingredients was speed mixed for 4 minutes at 1750 rpm, except for where noted. First, the hydroxyethyl methacrylate (HEMA), methacrylic acid, benzyl tributylammonium chloride (N+CL-), and methoxyethylhydroquinone (MEHQ) were combined and speed mixed with a DAC 400.2 VAC (FlackTek, Inc.) for 4 minutes at 1500 rpm. Then the solid EPX-IEM material was melted in an oven at 66° C. (150° F.), and the melted material was added to the speed mixer cup, and the resulting material was speed mixed at 2250 rpm for 4 minutes. XT100 was then added to the speed mixer cup, and the mixture was speed mixed for 4 minutes at 1900 rpm. The Baymod rubber material was then added next, and the mixture was speed mixed for 4 minutes at 1900 rpm. The material was let to cool for 5 minutes, and then speed mixed for 4 minutes at 1900 rpm. The speed mixing procedure was then repeated. Next, the CuNap, PAM 200, HDK H18, and ESS50F were added, and the mixture was speed mixed at 1900 rpm for 4 minutes. The PW80, CB, and SL300 were added and the mixture was speed mixed for 4 minutes at 1900 rpm. The final adhesive resin mixture was then degassed by capping the mixing cup with a polypropylene lid that contained a vent hole, and high-shear mixed under reduced pressure 0.68 psi (~35 Torr) for 2 minutes. The adhesive resin mixture prepared was separately loaded into the 10-part side of a 10:1 dual syringe cartridge dispenser, using the accelerator with the trade designation "3M SCOTCH-WELD DP8810NS" Acrylic Adhesive (3M Company) in the 1-part side of the dispenser in each case.

TABLE 5

| Components for Illustrative Example A | Weight % |
|---|---|
| HEMA | 32.78 |
| Methacrylic Acid | 19.31 |
| CLEARSTRENGTH XT100 | 5.00 |
| BAYMOD N 34.52 | 2.00 |
| MEHQ | 0.05 |
| N + Cl− | 0.62 |
| EPX-IEM | 24.00 |
| CuNap | 0.09 |
| PAM 200 | 3.11 |
| ESS50F | 0.60 |
| HDK H18 | 2.00 |
| PW80 | 9.94 |
| CB | 0.20 |
| SL300 | 0.30 |
| Total | 100.00 |

Illustrative Example B

Illustrative Example B was prepared by combining components in the amounts indicated in Table 6 in a polypropylene MAX 600 DAC cup (FlackTek, Inc.). Each of the sets of material ingredients was speed mixed as noted. First, the hydroxyethyl methacrylate (HEMA), methacrylic acid, lauryl methacrylate, isobornyl methacrylate, benzyl tributylammonium chloride (N+CL-), and methoxyethylhydroquinone (MEHQ) were combined and speed mixed with a DAC 400.2 VAC (FlackTek, Inc., Landrum, SC) for 4 minutes at 1500 rpm. Then the solid EPX-IEM material was melted in an oven at 71° C. (160° F.) over several hours, and the melted material was added to the speed mixer cup, and the resulting material was speed mixed for 4 minutes at 2250 rpm. The XT100 was then added to the speed mixer cup, and the mixture was speed mixed for 4 minutes at 1900 rpm. The Baymod rubber material was then added next, and the mixture was speed mixed for 4 minutes at 1900 rpm. The material was let to cool for 5 minutes, and then speed mixed for 4 minutes at 2250 rpm. The material was let to cool for a few more minutes, and then speed mixed for 4 minutes at 1900 rpm. Next, the CuNap, PAM 200, HDK H18, and ESS50F were added, and the mixture was speed mixed for 4 minutes at 1900 rpm. The PW80, SB, and SL300 was added next and the mixture was speed mixed for 4 minutes at 1900 rpm. After mixing, the material was cooled in a freezer for 5 minutes. Methyl methacrylate was then added followed by speed mixing for 1 minute at 2250 rpm. After speed mixing, the final adhesive resin mixture was then degassed by capping the mixing cup with a polypropylene lid that contained a vent hole, and high-shear mixed under reduced pressure 0.68 psi (~35 Torr) for 2 minutes. The adhesive resin mixture prepared was separately loaded into the 10-part side of a 10:1 dual syringe cartridge dispenser, using the accelerator with the trade designation "3M SCOTCH-WELD DP8810NS" Acrylic Adhesive (3M Company, St. Paul, MN) in the 1-part side of the dispenser in each case.

TABLE 6

| Illustrative Example B | Weight % |
|---|---|
| LMA | 5.00 |
| HEMA | 13.00 |
| Methacrylic Acid | 19.00 |
| MMA | 11.00 |
| IBOMA | 8.92 |
| CLEARSTRENGTH XT100 | 6.34 |
| BAYMOD N 34.52 | 2.04 |
| MEHQ | 0.05 |
| N + Cl− | 0.57 |
| EPX-IEM | 18.00 |
| CuNap | 0.11 |
| PAM 200 | 3.36 |
| ESS50F | 0.67 |
| HDK H18 | 2.51 |
| PW80 | 8.95 |
| CB | 0.15 |
| SL300 | 0.34 |
| Total | 100.00 |

Results

The Tg of each cured adhesive was measured using the tan delta peak from the DMA analysis, and the Tg data is listed in Table 7.

TABLE 7

DMA Tg (tan delta) and % Elongation for Adhesive Formulations

| Cured Adhesive | Tg (tan delta) in ° C. | % Elongation |
|---|---|---|
| Ill. Ex. A | 137-139 | 21% |
| Ill. Ex. B | 136-140 | 16-18% |
| Example 1 | 158 | 6-8% |
| Example 2 | 138 | 51% |

The resulting mixed adhesive was used to prepare overlap shear test samples on various substrates at various temperatures (Temp.). All bonds for overlap shear testing were prepared by dispensing approximately 0.3 grams of adhesive resin mixture and the accelerator resin through a static mixing tip. Overlap shear testing was conducted on Example 1, Example 2, Illustrative Example A (Ill. Ex. A) and Illustrative Example B (Ill. Ex. B) on non-surface treated Nylon 6,6, aluminum, and FR4 Glass Epoxy coupons as described in the Overlap Shear Test above, and the results are presented in Tables 8 and 9, below.

TABLE 8

| Overlap Shear on Plastic, Metal, and Composite Substrates, psi (Failure Mode). | | | | | |
|---|---|---|---|---|---|
| Substrate | Temp. (° C.) | Example 1 | Example 2 | Ill. Ex. A | Ill. Ex. B |
| Nylon 6,6 | 23 | 592 (adhesive) | 1069 (cohesive-mixed) | 1387 (cohesive) | 1069 (cohesive-mixed) |
| Green FR-4 | 23 | 2271 (cohesive) | ND | 3246 (cohesive) | 2491 (cohesive) |
| aluminum | 23 | 2600 (cohesive) | 2976 (cohesive) | 3438 (cohesive) | 3225 cohesive |
| aluminum | 120 | 1436 (cohesive) | ND | 903 (adhesive/mixed) | 970 (mixed) |

ND = not determined

TABLE 9

| Property/Test Data | Example 1 | Ill. Ex. A | Ill. Ex. B |
|---|---|---|---|
| Side Impact at 23 C. (J) | 7.9 | 8.9 | ND |
| Bell Peel strength on Al at −40 C. | 17.7 | 26.15 | 2.4 |
| Bell Peel strength on Al at 23 C. | 35.1 | 32.7 | 18.0 |
| Bell Peel strength on Al at 85 C. | ND | 47.2 | ND |

ND = not determined

Two-Week 60° C. Water Soak Test Data was collected for Example 2, Illustrative Examples A and B, and DP8407 on fiberglass epoxy substrates as described in the Water Soak Overlap Shear Test, and results are percent retention of the bond strength and are reported in Table 10, below.

TABLE 10

| Two-Week 60° C. Water Soak Test - Fiberglass Epoxy (FR4) Substrate | | | | |
|---|---|---|---|---|
| | % Overlap Shear Strength Remaining (Peak Stress) | | | |
| weeks | Ill. Ex. A | Ill. Ex. B | Example 2 | DP8407 |
| 0 | 100 | 100 | 100 | 100 |
| 1 | 68 | ND | ND | ND |
| 2 | 49 | 107 | 107 | 101 |

ND = not determined

A two-week Cataplasm Test was conducted on Example 2 and Illustrative Examples A and B. The results are shown in Table 11, below.

TABLE 11

| Cured Adhesive | % strength retention after 2 week cataplasm test |
|---|---|
| Ill. Ex. A | 3% |
| Ill. Ex. B | 42% |
| Example 2 | 40% |

The preceding description, given in order to enable one of ordinary skill in the art to practice the claimed disclosure, is not to be construed as limiting the scope of the disclosure, which is defined by the claims and all equivalents thereto.

What is claimed is:

1. A composition comprising:

at least 16 percent by weight, based on the total weight of acrylic-functional compounds in the composition, of an acrylic monomer comprising a cycloalkyl group having up to 12 carbon atoms;

an acrylic monomer comprising a carboxylic acid group;

an acrylic monomer comprising a hydroxyl group; and a compound comprising divalent segments L and at least two X groups, wherein the divalent segments L are represented by the formula:

$$-[(R^1-O)_n R^1]- \qquad L$$

wherein each divalent segment L is respectively directly bonded to:

i) two secondary N atoms, each directly bonded to a further divalent segment L or an X group, ii) two tertiary N atoms, each directly bonded to p further divalent segments L and (2-p) X groups, wherein p is 0, 1, or 2, or iii) a secondary N atom directly bonded to a further divalent segment L or an X group; and a tertiary N atom directly bonded to p further divalent segments L and (2-p) X groups, wherein p is 0, 1, or 2, wherein each $R^1$ independently represents an alkylene group having from 1 to 4 carbon atoms, with the proviso that at least some of the $R^1$ groups are $-CH_2-CH_2-CH_2-CH_2-$, wherein each n independently represents a positive integer, and wherein each X group is independently represented by the formula $$CH_2=C(R)-C(O)-O-V\text{-}W-C(O)-$$

wherein each R is independently hydrogen or methyl, wherein each W is independently O, S, or $NR^2$, wherein $R^2$ is hydrogen or alkyl having up to 4 carbon atoms, and wherein each V is independently alkylene that is optionally interrupted by at least one ether linkage or amine linkage and optionally substituted by hydroxyl.

2. The composition of claim 1, wherein the acrylic monomer comprising the carboxylic acid group is present in an amount of at least 20 percent by weight, based on the total weight of the acrylic-functional compounds in the composition.

3. The composition of claim 1, wherein the acrylic monomer comprising the hydroxyl group is present in an amount of at least 10 percent by weight, based on the total weight of the acrylic-functional compounds in the composition.

4. The composition of claim 1, wherein the compound comprising divalent segments L and at least two X groups is present in an amount in a range from 20 percent by weight to 40 percent by weight, based on the total weight of acrylic-functional compounds in the composition.

5. The composition of claim 1, further comprising methyl methacrylate.

6. The composition of claim 1, wherein the acrylic monomer comprising the cycloalkyl group having up to 12 carbon atoms comprises at least one of isobornyl acrylate or isobornyl methacrylate.

7. The composition of claim 1, further comprising a toughening agent.

8. The composition of claim 1, further comprising a filler.

9. The composition of claim 1, further comprising a free-radical initiator.

10. The composition of claim 1, packaged as a first part of a two-part adhesive composition, wherein a second part of the two-part adhesive composition comprises a free-radical initiator.

11. An adhesive comprising the composition of claim 1 at least partially cured with a free-radical initiator, wherein the adhesive has a glass transition temperature in a range from 120° C. to 180° C.

12. An adhesive comprising the composition of claim 1, at least partially cured with a free-radical initiator, wherein at least one of the following limitations is met:

the adhesive bonds to polyamide and provides an overlap shear strength of at least 1000 psi at room temperature; or the adhesive bonds to aluminum and provides an overlap shear strength of at least 1000 psi at 120° C.

13. An article bonded with the composition of claim 1 at least partially cured with a free-radical initiator, wherein the article comprises at least one of polyamide, metal, or an epoxy composite.

14. A method of making a bonded article comprising a first substrate and a second substrate, the method comprising:

combining the composition of claim 1 with a free-radical initiator to provide an adhesive composition;

applying the adhesive composition on at least one of the first substrate or the second substrate;

adhering the first substrate and the second substrate using the adhesive composition; and allowing the adhesive composition to at least partially cure to make the bonded article.

15. The method of claim 14, wherein at least one of the first substrate or the second substrate comprises at least one of polyamide, metal, or an epoxy composite.

16. The composition of claim 1, wherein at least fifty percent of the $R^1$ groups are $—CH_2—CH_2—CH_2—CH_2—$.

17. The composition of claim 1, wherein the divalent segments L are represented by formula

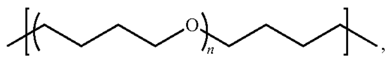, wherein each n represents a positive integer.

18. The composition of claim 1, wherein the composition is free of lauryl methacrylate or comprises up to one percent lauryl methacrylate, based on the total weight of the acrylic-functional compounds in the composition.

19. The composition of claim 1, wherein the acrylic monomer comprising the cycloalkyl group having up to 12 carbon atoms comprises at least one of isobornyl acrylate, isobornyl methacrylate, cyclohexyl acrylate, cyclohexyl methacrylate, t-butylcyclohexyl acrylate, or t-butylcyclohexyl methacrylate.

20. The composition of claim 1, wherein the acrylic monomer comprising the cycloalkyl group having up to 12 cabon atoms is present in an amount of at least 17 percent by weight and up to 40 percent by weight, based on the total weight of the acrylic-functional compounds in the composition.

* * * * *